(12) United States Patent
Horton

(10) Patent No.: US 7,293,003 B2
(45) Date of Patent: Nov. 6, 2007

(54) SYSTEM AND METHOD FOR RANKING OBJECTS BY LIKELIHOOD OF POSSESSING A PROPERTY

(75) Inventor: Kurt H. Horton, Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 1307 days.

(21) Appl. No.: 10/103,059

(22) Filed: Mar. 21, 2002

(65) Prior Publication Data

US 2003/0182136 A1    Sep. 25, 2003

(51) Int. Cl.
*G06F 17/00* (2006.01)

(52) U.S. Cl. ............................ 706/45; 706/12; 706/14; 706/46; 705/1

(58) Field of Classification Search ................ 706/12, 706/15–18, 20, 21, 25, 45–48; 714/25, 26, 714/39, 48; 705/1
See application file for complete search history.

(56) References Cited

U.S. PATENT DOCUMENTS

| 5,388,189 | A | * | 2/1995 | Kung ............................ 706/45 |
| 6,012,152 | A | * | 1/2000 | Douik et al. ................... 714/26 |
| 6,487,677 | B1 | * | 11/2002 | Jantz et al. ...................... 714/2 |
| 6,611,825 | B1 | * | 8/2003 | Billheimer et al. ........... 706/45 |

* cited by examiner

*Primary Examiner*—Joseph P Hirl
*Assistant Examiner*—Omar F Fernández Rivas
(74) *Attorney, Agent, or Firm*—William J. Kubida; Michael C. Martensen; Hogan & Hartson LLP

(57) ABSTRACT

A system and method for ranking objects by a likelihood of possessing a property is disclosed. The system can be used, for example, to assist in the determination of system events, such as, e.g., computer system failures, based upon an analysis of customer service reports or the like.

25 Claims, 7 Drawing Sheets

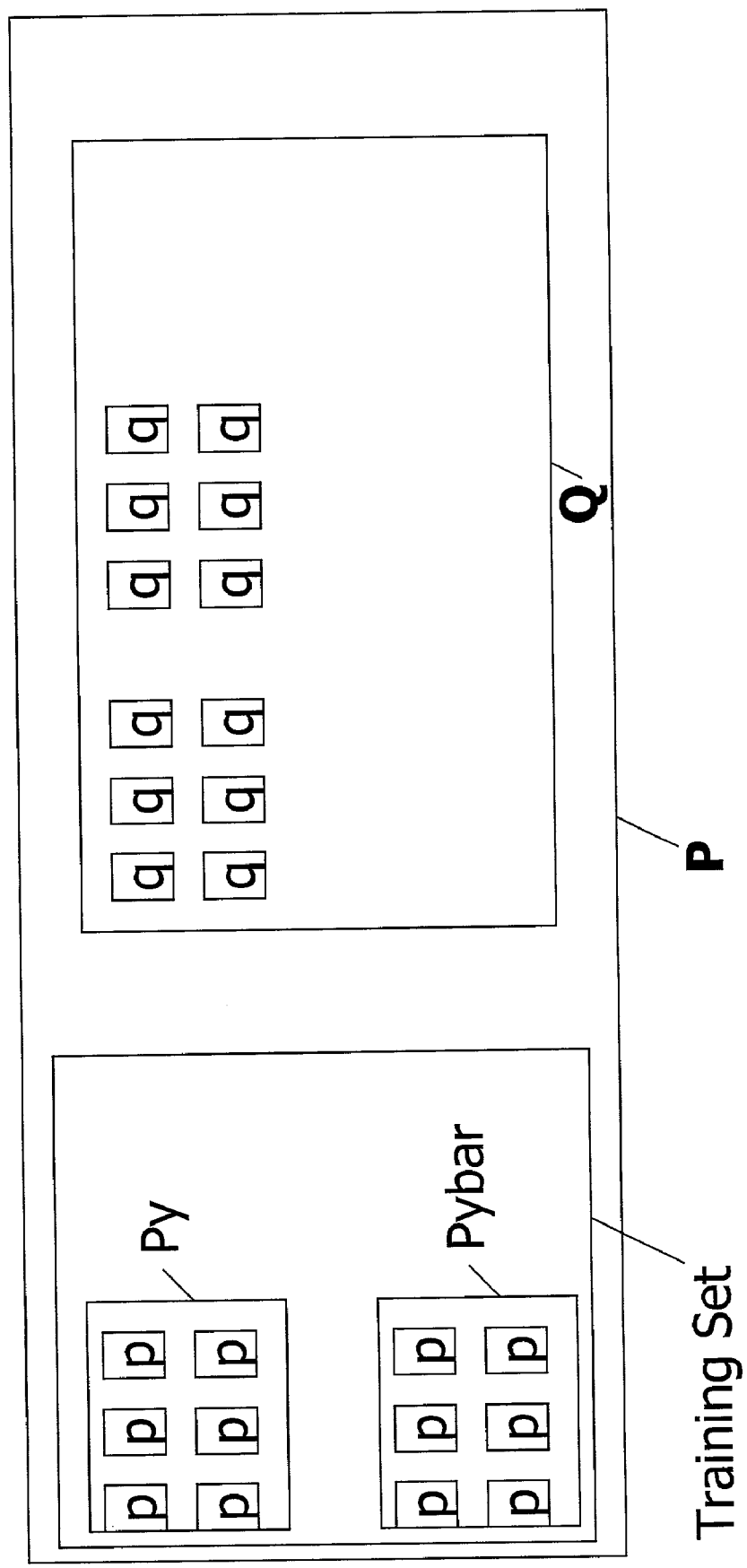

SYSTEM AND METHOD FOR RANKING OBJECTS BY LIKELIHOOD OF POSSESSING A PROPERTY

FIELD OF THE INVENTION

The illustrative embodiments of the present invention relate to ranking objects by a likelihood of possessing a property. In particular, some illustrative embodiments pertain to ranking objects (such as, for example, documents, such as customer service documents, or the like) to identify objects having certain properties, such as being related to, e.g., system events or conditions such as, e.g., system failures.

BACKGROUND OF THE INVENTION

In a variety of fields, users increasingly require high availability and/or operability of systems. Service centers are often provided through which users (e.g., customers or the like) can report events or problems related to system usage or the like. In many instances, the number of reported events or problems can be very large. Nevertheless, the various reported events or problems can often contain limited information.

In just some illustrative examples, in utility companies (e.g., gas, electric, water or the like), one or more user report may be provided (e.g., "lights are flickering" or the like) upon the discovery of an event or problem. Nevertheless, it can often be difficult to ascertain the underlying problems based on these various reports.

In various industries, users (e.g., customers or the like) may also provide reports related to various computer usage events or problems. Users increasingly require data and applications to be available substantially around the clock (e.g., 24 hours a day/7 days a week). With the increasing dependency on computer systems, availability and/or operability are of increasing interest. Availability and/or operability may be affected by computer hardware, computer software and the like.

In illustrative instances, service personnel may be assigned a task of identifying system events, such as system failures or other system problems. In some instances, these personnel rely on reports provided by customers. However, in some instances, personnel may make or initiate reports on their own.

In some illustrative instances, reports are filed as or under cases that may be assigned "priority" levels based on estimated levels of importance. For example, cases having potential problems or the like meeting certain definitions (e.g., related to system functionality, location, times or the like) may be given a particular "priority" level and may, in some circumstances, be "escalated" to another priority level based on other factors (e.g., additional reports, passage of time, etc.).

Identification of underlying events or problems can be of significant interest to various commercial and other enterprises, including, for example, to commercial enterprises providing computer and/or software services to various users, such as, for example, various application service providers (ASPs) that offer individuals or enterprises access over a network (such as, e.g., the Internet) to applications and related services.

SUMMARY OF THE INVENTION

Illustrative embodiments provide a system and method for ranking objects by a likelihood of possessing a property. The terminology "object" is a general term referring to an item of interest. An object may be tangible or intangible, but should be able to possess (or not possess) one or more properties of interest (e.g., Y) and to possess (or not possess) discernable features (f). A "property" is preferably externally defined in relation to a training set of objects. The terminology "features" is a general term and includes any possible feature, which may vary depending on the particular embodiment or application at hand. Features are preferably internally generated via computational methodologies hereunder given a particular training.

In some illustrative embodiments, the system and method may be used to review objects in an offline environment, such as, e.g., retroactively. In other embodiments, the system and method may be used in an online environment, such as, e.g., to provide ongoing monitoring of objects (for example, to identify a case or the like that is experiencing difficulties or the like).

In some embodiments, a method for ranking objects by the likelihood of possessing a property includes: storing electronic objects in at least one database; obtaining a training set of objects related at least one of known property (Y) and known non-property (Ybar); determining a likelihood that objects (q) within said population (Q) relate to at least one of said known property and known non-property; ranking said objects (q) for similarity to said training set of objects. In some embodiments, the method includes: isolating features (f) possessed by documents in said training set of documents; identifying the significance (s(f)) of said features (f) in distinguishing properties, such as in some examples events, (Y) or non-properties, such as in some examples non-events, (Ybar); selecting a subset (Fs) of a union (Fp) of said features (f) based upon said significance; computing a similarity indicator (ss(q)) for each document (q) to be ranked using the presence or absence of each feature (f) in said subset (Fs); rank ordering said population (Q) based on similarity indicator (ss(q)) values.

In other embodiments, a computer system for facilitating the determination of the likelihood that an object possesses a property includes: means for storing electronic objects in at least one database; means for obtaining a training set of objects related at least one of known property (Y) and known non-property (Ybar); means for determining a likelihood that objects (q) within said population (Q) relate to at least one of said known property and known non-property; and means for ranking said objects (q) for similarity to said training set of objects.

In other embodiments, a computer system for facilitating the determination of system events includes: at least one input unit for inputting information related to cases; at least one database for storing electronic documents based on information inputted via said at least one input unit, including a training set of documents related to at least one of known events (Y) and known non-events (Ybar); a processor coupled to said at least one database and to data storage; said data storage programmed to cause said processor to determine a likelihood that objects (q) within said population (Q) relate to at least one of said known events and known non-events; and said data storage programmed to cause said processor to rank said objects (q) for similarity to said training set of objects. In some instances, the at least one input unit includes a plurality of client computers including data entry devices for user input of information (e.g., wherein at least some of said plurality of client computers are located in a customer service center and/or at customer locations outside of a customer service center).

Various embodiments, aspects, advantages and/or benefits of various embodiments of the present invention will be appreciated based on the present disclosure. It is contemplated that various embodiments will include and/or exclude different aspects, advantages and/or benefits and that descriptions of aspects, advantages and/or benefits of the various embodiments should not be construed as limiting other embodiments nor the inventions claimed.

BRIEF DESCRIPTION OF THE DRAWINGS

The attached figures are shown by way of example and not limitation, in which:

FIG. 2 is a schematic diagram illustrating an illustrative population of objects that may be analyzed in some embodiments of the invention;

DETAILED DESCRIPTION OF ILLUSTRATIVE EMBODIMENTS

Figure 1:
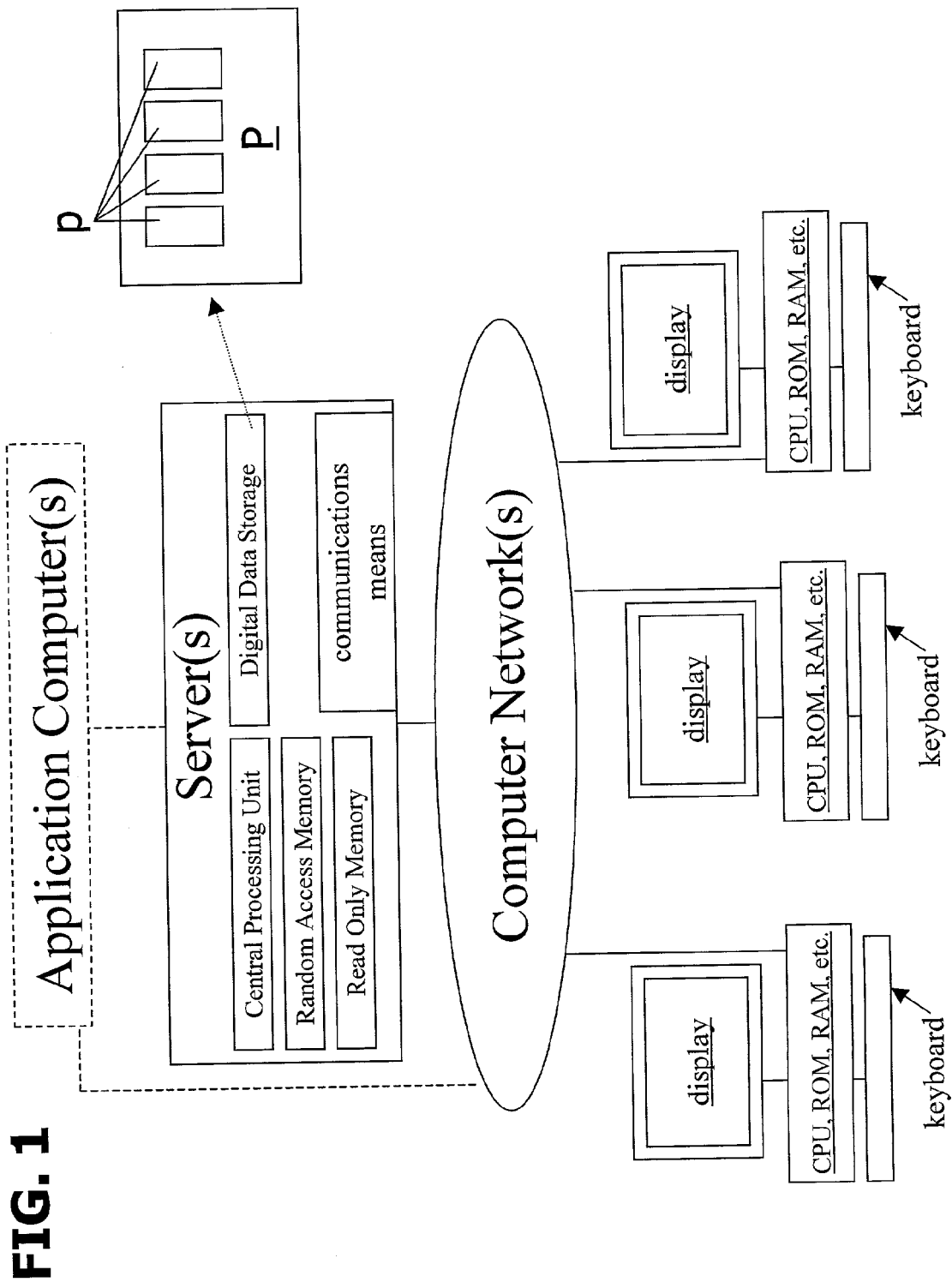
FIG. 1 is a block diagram of an illustrative computer system in which some embodiments of the present invention can be employed.

Illustrative embodiments of the present invention can be employed in a computer system having one or more computers. FIG. 1 shows one illustrative computer system in which some embodiments of the present invention can be employed, including a computer network (e.g. such as the world wide web, the Internet, a wide area network (WAN), an intranet, a virtual private network (VPN), any other network of computers, a combination of such networks, or the like) having at least one client computer (e.g., a personal computer, lap top computer, personal digital assistant or any other computer device or system) and at least one server for providing information to the client computers via the network. As shown, at least one application computer can be provided that is programmed to conduct analyses according at least one embodiment of the present invention. The application computer(s), client computers and server(s) can include any appropriate computers. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. The client computers may contain browser software for interacting with the server(s), such as, for example, using hypertext transfer protocol (HTTP) to make requests of the server(s) via the Internet or the like.

In an illustrative example, the system shown in FIG. 1 can be used to enable users at client computers to submit information (e.g., text information, reports, responses, etc.) that can be retained in digital data storage of the server(s) and/or in one or more other computer. In this illustrative example, this information can then be analyzed via the application computer(s) according to embodiments of the present invention.

While the illustrated embodiment shows a client/server system, various other embodiments can include one or more computer. For example, one or more computer can include information in data storage that can be analyzed according to embodiments of the present invention. For example, data may be entered, stored and analyzed on a single computer in some embodiments. The manner in which information is obtained and/or stored, e.g., in digital data storage, may vary depending on circumstances. In some embodiments, a sniffer program (i.e., that captures and reads packets of data) could even be used to capture data being transmitted on a network, such as via a network router with a sniffer that reads data in packets along with, e.g., source and destination addresses.

In some embodiments, in order to conduct an analysis of information contained in digital data storage or databases, an HTTP interface can be provided to "text format" cases, while in other embodiments, direct access to underlying database(s) using, e.g., ORACLE 8 or the like can be provided and/or access to underlying files using NETWORK FILE SYSTEM™ (NFS) or the like can be provided. NFS is a client/server application that allows a user to view, store and/or update files on a remote computer as though they were on the user's own computer. In the latter instance, for example, the application computer(s) or the like could have an NFS client and the server(s) or the like could have an NFS server. Both of these may also have TCP/IP installed as versions of NFS server and client use TCP/IP to send files and updates back and forth.

Embodiments of the invention may be employed within a variety of applications. In addition to applications described in relation to some preferred embodiments, embodiments may be employed, for example, in: 1) network [e.g., Internet and/or world wide web] search engines in which content [e.g., web sites, web pages, URLs or the like] are to be located or identified [e.g., in some embodiments, user input or responses in relation to some objects may be used to define a training set]; 2) predictive failure functionality systems, such as Self-Monitoring Analysis Reporting Technology (SMART) systems that monitor disk drives or the like; 3) document management systems; 4) data warehouses systems; and 4) other systems in which electronic objects (e.g., documents in some illustrative embodiments) may be located based on known properties and discernable features.

Illustrative Analysis Methods:

In illustrative embodiments of the present invention, objects can be ranked based on the likelihood of possessing a property. In some illustrative embodiments, with reference to FIG. 2, given a population P of objects p and two disjoint sub-populations Py and Pybar, each member of which is known by external means to possess a property Y or not possess property Y (or stated equivalently "possessing property Ybar") according to its containing sub-population, the method will rank objects q in population Q (a sub-population of P under evaluation) for similarity to those in population Py, and so likewise rank them for likelihood of possessing property Y. In some embodiments, a complementary calculation can rank for the likelihood of possessing a property Ybar. Py is preferably a subset of objects possessing property Y, rather than the collection of all objects possessing the property Y. The "external means" can include, for example, human analyses (e.g., based on expert determination in some instances) and/or automated analyses. Py is a disjoint set from Pybar. Together, Py and Pybar can make up a "training set" to be analyzed for the features distinguishing property Y from property Ybar. In other embodiments, this can be generalized to any further number of disjoint subsets for multi-level (e.g., non-boolean) properties.

Because the property Y (or, similarly, Ybar) is not likely immediately evident upon inspection of objects p in Py or Pybar, surrogate features f, more easily evident in p, can be identified, evaluated for significance, and selected for ranking objects q in Q. As discussed above, features f can be internally generated by computational methods for a given training set.

Figure 3:
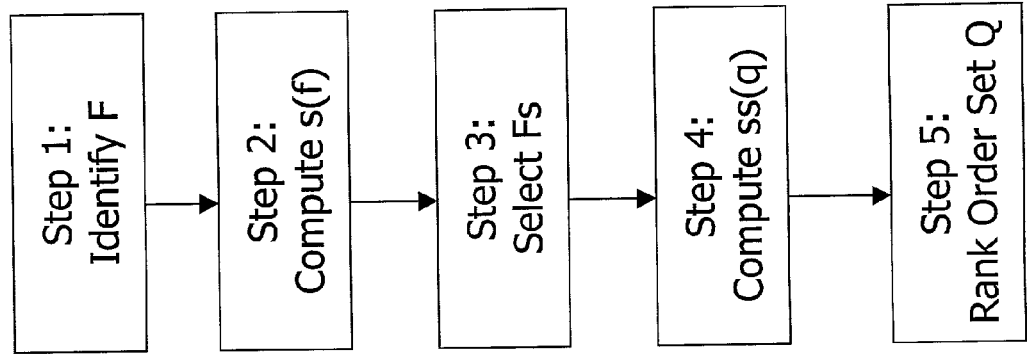
FIG. 3 is a flow diagram showing some process steps according to some embodiments of the invention.
Figure 4:
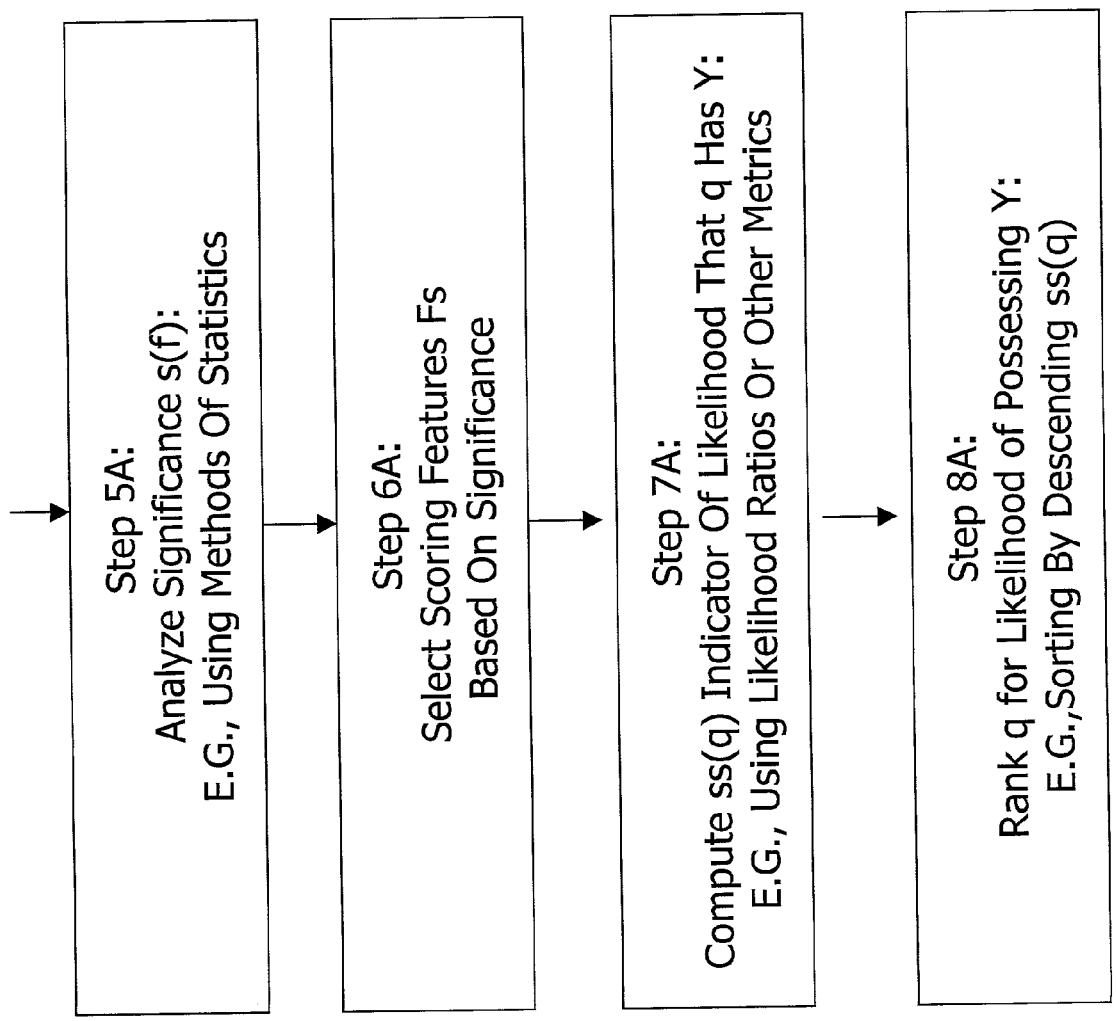

With reference to FIG. 3, the methodology may include identifying Fp, a union of features possessed by each object p in Py or Pybar (Step 1). Then, for each feature f possessed by any object p in Py or Pybar, the significance of f, s(f), in distinguishing members of Py from members of Pybar may be computed (Step 2). The union of these features f may be set F. That is, F is the union of features possessed by the training objects in the union of Py and Pybar. Then Fs, a subset of F used for scoring, may be selected, guided by the significance s(f) and other metrics of each feature f in F (Step 3). Fs will be used for ranking population Q. Finally, a similarity indicator ss(q) may be-computed for each object q in population Q using the presence/absence (in object q) of each feature f in Fs (Step 4). The similarity indicator ss(q) depends implicitly on Fs and, thus, may also be expressed as ss(q, Fs). A set Q, sorted by descending ss(q), is rank ordered for similarity to objects p in Py and so, also, ranked by likelihood of possessing property Y (Step 5).

In some illustrative embodiments, the features F are obtained directly from the objects p in Py or Pybar, without external input or judgment as to exact nature or value, but rather only general notions of the nature of the features.

In some illustrative embodiments, the method can involve two disjoint populations Py and Pybar, but in various alternative embodiments, it can be generalized to any arbitrary number L of disjoint sub-populations possessing an L-level property Z. Moreover, the exact nature of property Y may depend on a particular set of circumstances and should not limit the broad scope of the present invention.

Illustrative Embodiments:

Illustrative embodiments of the present invention are described below with reference to, e.g., FIG. 4. In some illustrative embodiments, a population of objects P includes a set of text documents describing service cases, each object p (a member of P) can be an individual case document. Text documents can include, e.g., information entered by users (e.g., in English or another language or the like) into an electronic format describing or related to a service case. Text documents can be in any known format, including, as merely some examples, Rich Text Format (RTF), American Standard Code For Information Exchange (ASCII), Unicode, EBCDIC and/or any other known format. "Text" can include, for example, sequences of tokens (such as, for example, characters and/or words which may be, for example, human-readable in some cases) that can be, for example, encoded into computer readable formats. Characters and/or words may include, as merely some examples, hexadecimal characters, character strings, etc. While some illustrative "documents" relate to text documents, other embodiments may employ other document formats, such as image files, audio files and/or other formats.

Figure 4:
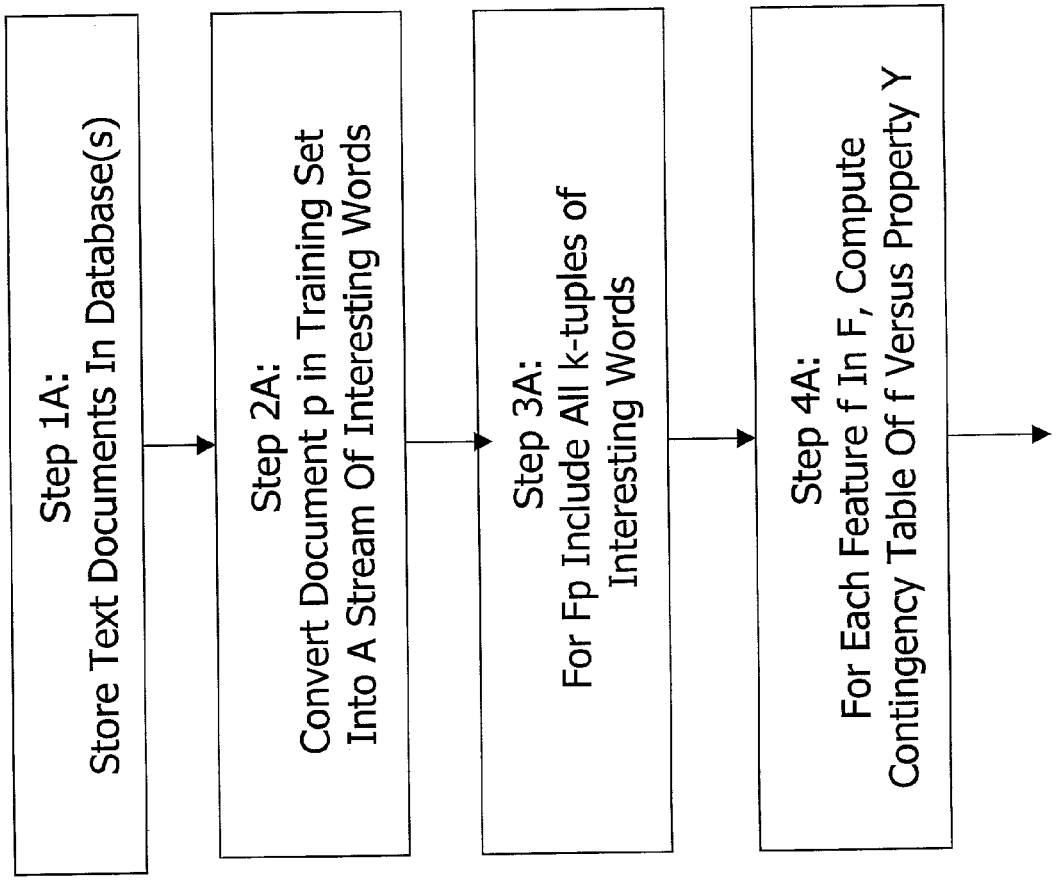
FIG. 4 is a flow diagram showing some process steps according to some illustrative embodiments of the invention.

As shown in FIG. 4, text documents can be stored in at least one database(s)(Step 1A). Property Y may be, for example, associated with a small number of service cases and its prevalence may be of interest (e.g., to management or the like). In many practical circumstances, the existence of a vast number of cases p in P and the large effort required to judge property Y for each p may make the task of identifying cases with property Y difficult and/or infeasible. Illustrative embodiments of the present invention can be used to greatly facilitate this and/or other tasks.

In illustrative embodiments, each case p in Py or Pybar can be analyzed for features f by converting a document related thereto (e.g., a digitally stored text document related to a case p) into a stream of "interesting" tokens (such as, for example, interesting "words")(such as, for example, words that remain after eliminating uninteresting "noise" words) (Step 2A). The union of features Fp in a document p can include, for example, all k-tuples of interesting tokens (e.g., words) ($1<=k<=K$, $K<=N$) selected from a window (e.g., by proximity) of interesting tokens. For example, the window may be a floating window of a previous N interesting tokens (e.g., words) in the document (N and K can be, e.g., parameters of the implementation selected as a compromise between execution time, storage required, and desired feature detail)(Step 3A). The analysis can, thus, include a proximity in a token stream representation of a document. A case document can include many sub-documents and the proximity approach may effectively find a union of features associated with the subdocuments.

F can be the union of all features across all documents p in Py or Pybar.

For each f in F, cfy can be the count of documents p in Py containing feature f. Similarly, cfybar can be the count of documents p in Pybar containing feature f. Additionally, cfbary can be the cardinality of Py minus cfy (the number of documents in Py not possessing feature f). Similarly, cfbarybar can be defined correspondingly as Pybar minus cfybar (the number of documents in Pybar not possessing feature f).

For each feature f in F, in illustrative embodiments, a 2×2 contingency table, such as {cfy, cfybar, cfbary, cfbarybar}, of feature f versus property Y can be determined (Step 4A). This table can be analyzed for significance using any appropriate known standard methods of statistics or the like (Step 5A). As merely some examples, a Chi-square test of association or a Fisher exact probability test, depending on specific values, can be used. Then, the resulting/associated probability values can be used to qualify and rank the individual f in F for significance. Then, this significance can be used to guide selection of f to create the scoring features Fs, a subset of F (Step 6A).

A "positive likelihood ratio"—PLRf, which can be defined as $(Pr(Y|f)/Pr(Ybar|f))/(Pr(Y)/Pr(Ybar))$—and a "negative likelihood ratio"—NLRf, which can be defined similarly but substituting fbar for f—offer some illustrative methods of computing ss(q), an indicator of likelihood that document q possesses property Y (assuming features of q were similar to members of the training set)(Step 7A). Let ss(q) for document q in the set Q be the product of PLRf for each f (an element of Fs) present in q multiplied by the product of NLRf for each f (an element of Fs) not present in q. For convenience, ss(q) can be computed as a running sum of the logarithm of the underlying likelihood metric and the final result can be reported as the logarithm of the geometric mean of the individual likelihood ratio factors.

The likelihood ratio described above is just one of many illustrative metrics that can be computed from a 2×2 contingency table, and is only one example according to illustrative embodiments of the invention. It is contemplated that various other metrics and/or computations can be used in various other embodiments. While some embodiments may employ 2-level or boolean methodologies, such as in 2×2 contingency tables, it is contemplated that the methodologies can be generalized to multi-levels (e.g., to substantially any number of levels depending on circumstances).

Preferably, sorting q for descending ss(q) produces a desired ranking of Q for similarity to members of Py and likelihood of possessing property Y (Step 8A).

The statistical significance of the product of likelihood ratios may depend on the independence of the associated features. Illustrative embodiments herein do not ensure independence of features nor need to address this issue. Thus, the resulting ss(q) may not formally be likelihood ratios, but rather, e.g., only indicators of likelihood. Further, the prevalence of property Y in the training set may differ greatly from the prevalence of property Y in population Q, so ss(q) may be a relative indicator whose actual value may be of little interest. Illustrative embodiments of the present invention are more interested in usefulness, rather than statistical validity.

In some embodiments "noise" filter may be used. For instance, a noise filer may remove certain or all hexidecimal numbers, telephone numbers or any other aspect deemed to be noise and may include, for example, stop lists of patterns, etc. In such cases, the noise token criteria may bias the feature analysis to some extent as it censors the data. Accordingly, judicious selection of noise criteria can limit this effect. Additionally, establishing the form of individual f as, in an illustrative case, "k-tuples from a window of N words" may limit the nature of features evaluated. These are merely illustrative examples and other embodiments of the invention may be varied as would be appreciated by those in the art based on this disclosure.

Illustrative Computational Methods:

As discussion herein, illustrative embodiments may utilize contingency table analyses. In this regard, for example, two-by-two (2×2) contingency tables have been used in a number of disciplines. The formats and/or styles used in such disciplines may differ in some details, but the underlying theories may remain substantially consistent. One illustrative style that can be employed in embodiments of the present invention is described below.

Illustrative table styles that can be used can be similar to that of the public health community, such as shown at http://www.cdc.gov. In brief, a basic 2×2 contingency table can compare two boolean attributes X and X-not ("XBAR") and Y and Y-not ("YBAR"). In some embodiments, X can be assumed to be the result of some diagnostic test while Y can represent the actual condition being tested for (e.g., true status obtained by an external means [e.g., some method other than the diagnostic test] and presumed authoritative).

In some illustrative embodiments described herein, X could be the presence (or XBAR the absence) of a specific tuple in a document, while Y could be, e.g., system events such as system failure (such as, e.g., data integrity field failure events (DIFFs) discussed infra) or non-system failure status determined by case review.

Table 1 below shows the observed frequencies (a,b,c,d) for the various combinations of X and Y (freq(X&Y)==a, freq(X&YBAR)==b, etc.). Table 1 represents one feature's properties across the training set.

TABLE 1

| | | True Status | | |
|---|---|---|---|---|
| | | Y | YBAR | marginal totals |
| test result: | X | a | b | a + b |
| | XBAR | c | d | c + d |
| | marginal totals | a + c | b + d | a + b + c + d |

There are a variety of statistics that can be calculated from these observed frequencies. In some embodiments, a Chi-square statistic can be used in identifying significant tuples and "positive and negative likelihood ratios" can be used in scoring similarity.

The calculation of Chi-square can employ known techniques. Some embodiments may use a simple Chi-square calculation (without correction for small samples) and may follow a minimum expected frequency criteria (such as, e.g., >=5). Preferably, the Chi-square statistic is used simply for ranking "significance," rather than to compare it against some specific value as a test of significance given some probability value or "p-value."

With respect to "positive/negative likelihood ratios," there can be some variation in definition which may be employed. The manner in which these metrics may be employed in some illustrative embodiments is set forth below, using some basic terms similar to that from conditional probability.

In some embodiments, a likelihood ratio includes the ratio of two probabilities. For example, it may take on values of between "0" and "infinity" (NB: it would be undefined if the denominator becomes 0).

In some embodiments, the positive likelihood ratio (PLR) is a ratio of probability ratios. For example, it may be:

$$PLR = (Pr(Y|X)/Pr(YBAR|X))/(Pr(Y)/Pr(YBAR))$$
$$= (a/b)/((a+c)/(b+d))$$
$$= a*(b+d)/(b*(a+c))$$

In the above equation, Pr(Y|X) is the conditional probability of Y given that X has already occurred and is read as the "probability of Y given X."

PLR may answer, for example, the question "how many times more likely is it I have condition Y now that I have test result X."

Further, the related value is the negative likelihood ratio (NLR) which may be:

$$NLR = (Pr(Y|XBAR)/Pr(YBAR|XBAR))/(Pr(Y)/Pr(YBAR))$$
$$= (c/d)/((a+c)/(b+d))$$
$$= c*(b+d)/(d*(a+c))$$

NLR may answer, for example, the question "how many times more likely (e.g., less likely when NLR<1) is it I have condition Y now that I have a test result XBAR."

In view of the foregoing, Y can map into, e.g., "is a system failure (such as, e.g., a data integrity field failure case discussed infra)," and feature X could be defined as, for example, "tuple T was present in case," and PLR and/or NLR can become measures of interest.

Further, one may compute an "average likelihood" as the geometric mean of the various PLR/NLR of the tuples based on their presence/absence in the case. This can be easily accomplished by accumulating log(PLR) or log(NLR) depending on tuple presence and dividing by number of tuples at the end. Maintaining the result as a logarithm can allow greater dynamic range while maintaining the same order of scores.

The running product of the likelihood ratios may not formally be statistically valid because, e.g., the individual attributes (e.g., tuples) may not be independent themselves. However, illustrative embodiments can apply such a value simply to order the associated cases—that is, the preferred criteria is utility, not formal statistical significance.

Figure 5:
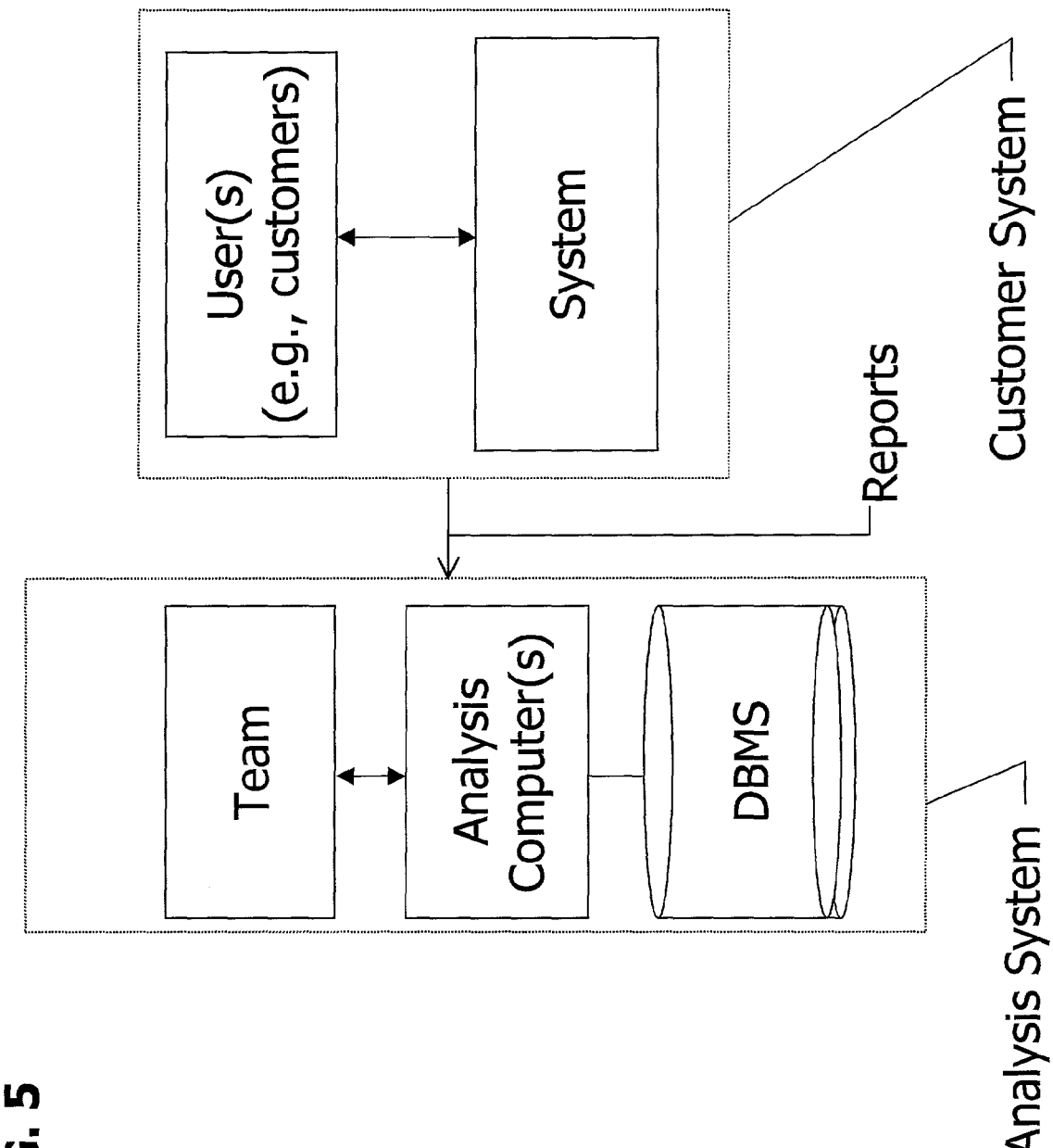
FIG. 5 is a schematic diagram depicting an illustrative and non-limiting environment wherein aspects according to some illustrative embodiments of the invention may be used by a team chartered with a task of identifying and/or analyzing system events.

Further Illustrative Embodiments:

With reference to FIG. 5, in some illustrative embodiments, a team may be chartered, for example, with learning and reporting on the prevalence of system events or failures or other system conditions of interest. For example, in a computer system, system conditions of interest may include, e.g., data integrity field failure events (DIFFs) reported by, for example, team members and/or customers or other users from various locations, such as worldwide. For example, with reference to FIG. 1, team members and/or customers may submit responses via client computers (e.g., via e-mail, via on-line forms provided via a network, e.g., via browser software or via other means) which responses can be stored in computer-readable files (e.g., text formats) in one or more database(s) associated with one or more computer(s)(e.g., server(s) in FIG. 1 and/or analysis computer(s) in FIG. 5) and analyzed via one or more computer(s)(e.g., application computer(s) in FIG. 1 and/or analysis computer(s) in FIG. 5) or the like. In some illustrative embodiments, a DIFF may include, for example, a specific customer problem meeting a particular definition. FIG. 5 schematically shows one illustrative environment including a system accessible by users (e.g., customers, team members and/or other users) that may result in system events or failures. As schematically shown, such events may, e.g., be discovered by users who may submit reports (e.g., via online forms, e-mail or any other form of digital communication or the like) related thereto that are stored via a database management system (DBMS). The analysis computer(s) may then perform analyses and provide a result for use by the team.

Some illustrative embodiments can be used to analyze the presence and/or absence of system events, such as, e.g., system failures, such as, e.g., computer system DIFF events. In some illustrative embodiments, to aid in better understanding the true prevalence of DIFFs (whether escalated and/or unescalated), a free text of cases can also be analyzed for features that may help uncover previously unidentified DIFF cases. Preferably, most every customer problem report/service action will have an associated case (e.g., including one or more text report) which can serve as an effective "choke point" to capture almost all such incidents.

Preferably, the text of a DIFF case contains enough snippets of information that while potentially not of obvious value individually, when taken collectively can be a valuable indicator of possible DIFF problems.

Preferably, the statistical analysis of these snippets can identify a fairly small number of significant snippets that can be used to "score" an individual case for similarity and so produce a ranked list of "likely suspects" for further investigation.

In illustrative embodiments, human judgment may be used to apply a current definition and to verify whether or not a candidate case is a true event (e.g., DIFF event). With this, a true prevalence can be estimated and the power of this can be demonstrated.

Figure 6:
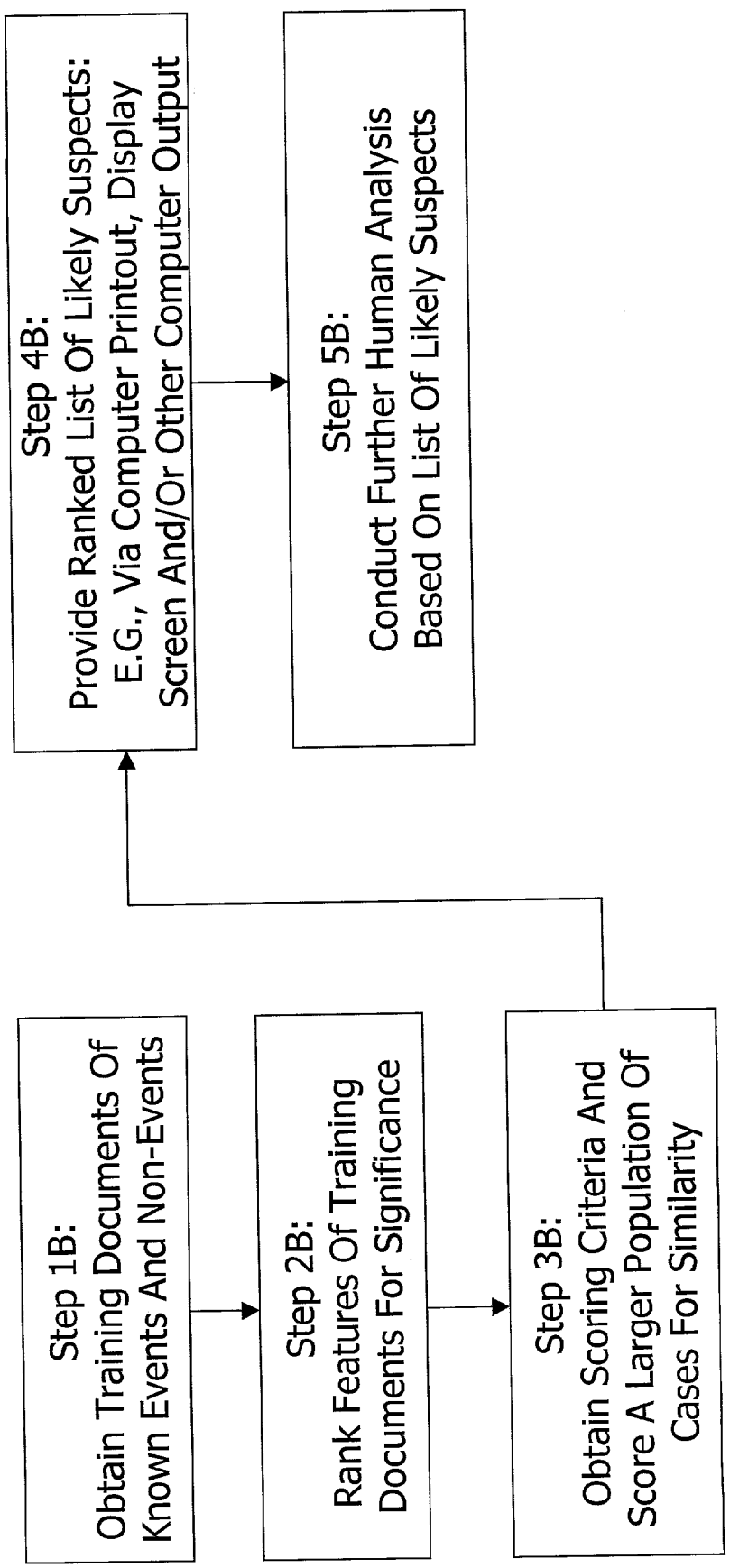
FIG. 6 is a flow diagram showing some process steps according to other illustrative embodiments of the invention.

With reference to the embodiment shown in FIG. 6, a body of known DIFF and known non-DIFF cases can be analyzed in text format ("Documents") to extract "document features." Together, DIFF and non-DIFF cases can be referred to as the "training documents" (Step 1B).

These "features" can then be ranked for significance and a subset selected for use as the scoring criteria (Step 2B).

This scoring criteria can be used to score another (e.g., larger) population of cases for "similarity" (Step 3B) and, as such, to provide a ranked list of "likely suspects" for further (e.g., human) analysis, such as via a computer printout, a computer monitor display screen and/or other another computer output (Step 4B).

While not necessarily a "litmus" test (e.g., a test that prompts a decision) for DIFF, this scoring criteria can be used to focus efforts needed (e.g., human efforts) for final and/or conclusive DIFF identification toward more productive candidates (Step 5B). In some embodiments, however, a specific set of criteria and/or cutoff score could be usable as a litmus test.

As discussed above, in some illustrative implementations, 2×2 contingency tables and the Chi-square test of association can be used. And, in some illustrative embodiments, which may have some similarities to problems in public health, some of the conventions of that discipline can be employed.

Figure 7:
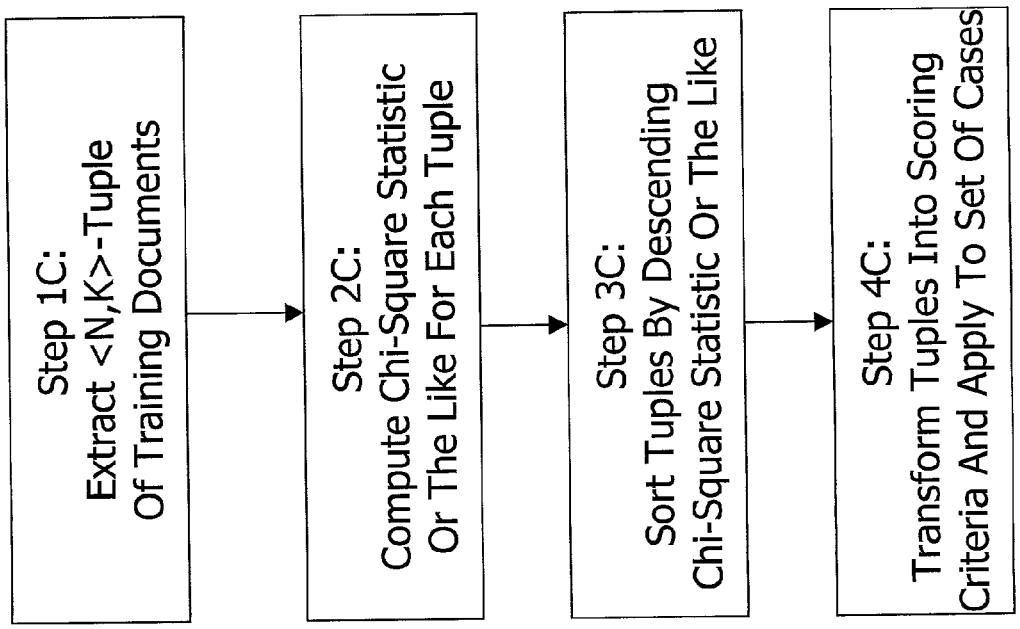
FIG. 7 is a flow diagram showing some process steps related to the analysis of the training documents according to other illustrative embodiments of the invention.

In illustrative embodiments, with reference to FIG. 7, the analysis of the training documents can start by extracting <5,3>-tuples of interesting tokens and recording their frequency by individual files (Step 1C). Despite potential use of noise filters (such as, for example, stoplists and other noise pattern filters), this step may generally result in a combinatoric explosion generating up to, e.g., millions of tuples for each file. The results of the individual documents can then be "rolled up" to a summary report of tuple, frequency, and number of documents containing tuple for the subsets of DIFF and non-DIFF documents.

Next, the raw frequency counts (and DIFF/non-DIFF status) can be used to compute an associated 2×2 Chi-square statistic for each tuple (Step 2C). The tuples can be sorted, e.g., by descending Chi-square for review/selection (Step 3C).

In some embodiments, the selection can include retaining only certain tuples in, for example, the "top 100 by descending Chi-square." Alternatively, selection to admit tuples with small frequency counts or even using alternative statistics may be productive.

Finally, the selected tuples can be transformed into a scoring criteria file and applied to a set of cases (Step 4C). In some embodiments, scoring can be implemented by computing the log of geometric mean of "positive/negative likelihood ratios" associated with the feature presence/absence. For example, positive values can indicate that it is more likely DIFF, while negative values can indicate that it is less likely a DIFF, while zero can indicate likelihood the same as the general population.

In some embodiments, tuning can be accomplished on at least two fronts—i.e., implementation efficiency and/or configuration efficiency.

In some instances, implementation efficiency can be tuned by using hash techniques to reduce execution times. Hashing can include, e.g., the transformation of a string of characters into a shorter fixed-length value or key that represents the original string. Hashing can be useful in, e.g., indexing and/or retrieving items in a database because it can be faster to find items using shorter hashed keys than to find them using the original values. In addition, efforts to limit the collection of "fruitless" data can be employed.

In illustrative embodiments, configuration efficiency can be improved by providing the best noise filters (e.g., using various noise pattern filtering methods, such as including, for example, stoplists of tokens to remove, keeplists of tokens to retain [e.g., to avoid improper token removal as an "antidote" to noise pattern removal], etc.) as well as selecting the best N and K for the <N,K>-tuples. In an illustrative embodiment, work can be done to develop a keeplist based on token lists of the training cases—e.g., significant token can be retained and putative noise can be eliminated. In some embodiments, a synonym list can be created to help improve test efficiency significantly.

In an illustrative "keep list" according to one non-limiting example, a first word of each line can be a word to "keep" in analyzing a document despite matching the stoplist and/or noise filters. In an illustrative example, at least some of these can be related to short English words containing only letters a-f that might be confused with hexadecimal numbers. In another example, others may be derived, for example, from reading the tuple lists generated and extracting interesting combinations which would be rejected. In another example, some words may be "generalized" from a word found in an existing document.

In experimentation related to some embodiments, during development of <1,1>-tuples to <10,2>-tuples, it was found that <5,3>-tuples were preferable in some circumstances. In many instances, <n,k>-tuples for large k (k>3) can be computationally impractical. In illustrative cases, if the computational effort is dominated by tuple generation from the token stream, then the following table (Table 2) may facilitate comparison of relative effort:

TABLE 2

| tuples | computational effort |
|---|---|
| <1,1> | T |
| <5,3> | 11*T == T* (1 + 4 + 6) |
| <10,2> | 10*T == T* (1 + 9) |
| In general: | |
| <n,2> | T*n |
| <n,3> | T* (1 + (n − 1,1) + (n − 1,2)) == T* (n + n* (n − 1)/2) |
| <3,k> | T* (1 + (n − 1,1) + (n − 1,2) + . . . + (n − 1,k − 1)) |

In illustrative embodiments, the approach may generate tuples using only words present in the training data. Accordingly, it may be helpful to use a rich collection of synonyms, any one of which might be used to describe a situation depending on the speaker, his or her environment, or the like, etc. Accordingly, some embodiments may include a synonym mapping that would coalesce synonyms into a single concept. In some embodiments, this could simply include rewriting of tokens, but more sophisticated suffix rewrite and/or context sensitive rewrite may yield more significant benefits.

In some embodiments, while Chi-square may be an effective tool for identifying "associated" tuples, other statistics may be effective in selecting the better scoring tuples from the set windowed with Chi-square. Some sets of tuples may be more independent than others and so have more power in identifying DIFF cases.

Preferably, experimentation can be carried out with the effectiveness of scoring based on various training set combinations, e.g.: known DIFFs and known non-DIFFS.

The Chi-square test can become less reliable with low expected frequency counts (e.g., <5) in any one cell. In these cases, in some embodiments, the Fisher Exact Probability test or another appropriate test could be used. In some embodiments, many tuples may have this property. While the "reliability" of the Chi-statistic is not necessarily of importance, since, e.g., ordering of tuples may still be achieved, it could be helpful to have a generally accepted method of dealing with small cell counts. This could include cell counts of 0.

In some embodiments, the known DIFF cases may be compared against random cases to identify the significant differences that will be useful in separating the likely suspects from the vast majority of uninteresting cases.

In some illustrative embodiments discussed above, where applicable, some of the following definitions may be applied.

1. N-tuple—a set of N-items. For example, (dog,bites, man) is an illustrative triple or 3-tuple of English words. For some purposes, N-tuples can be internally unordered—e.g., (bites,dog,man) can be the same as (dog,bites,man). In illustrative analyses, an equivalence class defined by internal ordering of the tuple items can be represented by the tuple with items in lexical (e.g., sort) order.
2. <N,K>-tuple—the set of all k-tuples (k<=K) obtained by taking k tokens from a sliding or floating "window" of the most recent N tokens of the interesting token stream. For example, collecting <1,1>-tuples may simply be a word list of the document, <2,2>-tuples may be all adjacent word pairs, etc.
3. Token—an interesting word from the input document. A token may include, for example, a word of a text stream obtained after isolating interesting words using a noise pattern filter, such as a stoplist, and/or a keeplist.
4. Token Stream—a stream of tokens generated from a document after one or more, preferably, all of keeplist, stoplist and/or noise filtering.
5. Stoplist—a list of words known to be uninteresting and so to be deleted from the token stream. A stoplist can be one method of eliminating noise from the token stream by specific enumeration of noise tokens to be omitted.
6. Keeplist—a list of words known to be interesting and so retained in a token stream despite matching the stoplist and/or noise patterns. A keeplist can be one method of providing an exceptions list to retain tokens that might otherwise be removed by a noise filter.
7. Noise Filter—a collection of regular expressions used to eliminate "noise" words from the token stream. Noise may include, for example, a token in the token stream that is considered uninteresting and hence omitted from the interesting token stream. Noise may include, in some illustrative instances, patterns representing times, hex numbers, e-mail headers, etc.

Broad Scope of the Invention:

While illustrative embodiments of the invention have been described herein, it will be appreciated that the present invention is not limited to the various embodiments described herein, but includes any and all embodiments having modifications, omissions, combinations (e.g., of aspects across various embodiments), adaptations and/or alterations as would be appreciated by those in the art based on the present disclosure. The appended claims are to be interpreted broadly based the language employed in the claims and not improperly limited to illustrative examples described in the present specification or in the prosecution of the application. As merely one example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts are not recited in support of that function.

What is claimed is:

1. A method for ranking objects by the likelihood of possessing a property, comprising:
   a) storing electronic objects in at least one database in memory of a computer system;
   b) obtaining a training set of objects with a sub-population known to possess property (Y) and with a sub-population known to possess non-property (Ybar) which is indicative of not possessing property (Y);
   c) determining a likelihood that objects (q) within a population (Q) of the stored objects relate to at least one of said known property and known non-property;
   d) ranking said objects and for similarity to said training set of objects;
   e) generating a report comprising the ranking of the objects for display, transmission, or storage in memory.

2. The method of claim 1, wherein the property pertains to system events.

3. The method of claim 2, wherein said system events include computer system events and wherein said objects include reports to customer service.

4. The method of claim 2, wherein the system events include data integrity field failures.

5. The method of claim 2, further including:
   a) isolating features (f) possessed by objects in said training set of objects;
   b) identifying the significance (s(f) of said features (f) in distinguishing events (Y) indicating possession of the property (Y) or non-events (Ybar) indicating lack of possession of the property (Y);
   c) selecting a subset (Fs) of a union (Fp) of said features (f) based upon said significance;
   d) computing a similarity indicator (ss(q)) for each object (q) to be ranked using the presence or absence of each feature (f) in said subset (Fs);
   e) rank ordering said population (Q) based on similarity indicator (ss(q)) values.

6. The method of claim 5, wherein said isolating features (f) possessed by objects in said training set of objects includes converting a object related thereto into a stream of interesting tokens.

7. The method of claim 6, wherein said stream of interesting tokens is obtained after eliminating noise tokens or tokens from a stop list.

8. The method of claim 6, wherein said union of features (Fp) includes all k-tuples of interesting tokens selected from a floating window of interesting tokens in a object.

9. The method of claim 8, wherein said identifying said significance includes creating a contingency table.

10. The method of claim 9, wherein said identifying said significance further includes performing a statistical analysis of said contingency table.

11. The method of claim 10, wherein said statistical analysis includes performing a Chi-square test of association.

12. The method of claim 11, wherein said subset (Fs) is created based on resulting values of said Chi-square test of association.

13. The method of claim 5, wherein said similarity indicator (ss(q)) is computed based on likelihood ratio.

14. The method of claim 13, wherein said similarity indicator (ss(q)) is computed by a product of the positive likelihood ratio for each feature (f) present in a ranked object (q) within population (Q) and a product of negative likelihood ratio for each feature (f) not present in such ranked object.

15. The method of claim 14, further including sorting objects (q) to be ranked by descending similarity indicator (ss(q)) values to produce a ranking for likelihood of relating to the event (Y) or the non-event (Ybar).

16. A computer system for facilitating the determination of the likelihood that an object possesses a property, comprising:
   means for storing electronic objects in at least one database in memory of the computer system;
   means for obtaining a training set of objects related at least one of known property (Y) and known non-property (Ybar), wherein relation to the known non-property is indicative of not possessing the known property;
   means for determining a likelihood that objects (q) within a population (Q) relate to at least one of said known property and known non-property;
   means for isolating features (f) possessed by objects in said training set of objects, wherein the features are surrogates for the known property;
   means for identifying the significance (s(f)) of said features (f) in distinguishing possession or non-possession of the known property;
   means for selecting a subset (Fs) of a union (Fp) of said features (f) based upon said significance;
   means for computing a similarity indicator (ss(q)) for each object (q) to be ranked using the presence or absence of each feature (f) in said subset (Fs);
   means for ranking said objects (q) for similarity to said training set of objects based on the determined likelihood and at least partially on the similarity indicator (ss(q)) values; and
   means for generating a report comprising the ranking of the object that is stored in the memory, transmitted over a communications network, or displayed on a display device.

17. The system of claim 16, wherein the property pertain to computer system events and wherein said objects pertain to customer service cases.

18. The system of claim 16, further including that said means for isolating features (f) possessed by objects in said training set of objects includes means for converting a object related thereto into a stream of interesting tokens.

19. The system of claim 18, further including means for eliminating noise tokens or tokens from a stop list.

20. The system of claim 18, wherein said union of features (Fp) includes all k-tuples of interesting tokens selected from a floating window of interesting tokens in a object.

21. The system of claim 20, wherein said means for identifying said significance includes means for creating a contingency table.

22. A computer system for facilitating the determination of system events, comprising:

a) at least one input unit for inputting information related to cases;
b) at least one database for storing electronic documents based on information inputted via said at least one input unit, including a training set of documents related to at least one of known events (Y) and known non-events (Ybar);
c) a processor coupled to said at least one database and to data storage;
d) wherein said data storage is programmed to cause said processor to determine a likelihood that objects (q) within a population (Q) relate to at least one of said known events and known non-events;
e) wherein said data storage is programmed to cause said processor to rank said objects (q) for similarity to said training set of objects to indicate likelihood of the known events being present in the ranked objects, the ranking being based also on the similarity of the ranked objects to the training set of documents related to the known non-events; and
f) wherein said processor storesstoring a report comprising the rank of said objects.

23. The system of claim 22, wherein said at least one input unit includes a plurality of client computers including data entry devices for user input of information.

24. The system of claim 22, wherein at least some of said plurality of client computers are located in a customer service center.

25. The system of claim 22, wherein at least some of said plurality of client computers are located at customer locations outside of a customer service center.

* * * * *

UNITED STATES PATENT AND TRADEMARK OFFICE
CERTIFICATE OF CORRECTION

| | |
|---|---|
| PATENT NO. | : 7,293,003 B2 |
| APPLICATION NO. | : 10/103059 |
| DATED | : November 6, 2007 |
| INVENTOR(S) | : Kurt H. Horton |

It is certified that error appears in the above-identified patent and that said Letters Patent is hereby corrected as shown below:

Column 13, line 27, delete "and"
Column 13, line 27, after "objects" insert --(q)--
Column 13, line 28, after ";" insert --and--
Column 13, line 41, after first occurrence of (f) insert --)--
Column 16, line 4, "storesstoring" should be --stores--

Signed and Sealed this

Eleventh Day of March, 2008

JON W. DUDAS
*Director of the United States Patent and Trademark Office*